April 23, 1963     H. R. SMITH, JR., ET AL     3,086,882
METHOD AND APPARATUS FOR FILMING ARTICLES BY VACUUM DEPOSITION
Filed July 2, 1958                           2 Sheets-Sheet 1

INVENTORS
Hugh R. Smith, Jr. and
BY William H. Colbert

Nobbe & Swope
ATTORNEYS

INVENTORS
Hugh R. Smith, Jr. and
BY William H. Colbert

Hobbs & Swope
ATTORNEYS

United States Patent Office 3,086,882
Patented Apr. 23, 1963

3,086,882
METHOD AND APPARATUS FOR FILMING ARTICLES BY VACUUM DEPOSITION
Hugh R. Smith, Jr., Oakland, Calif., and William H. Colbert, Ligonier, Pa., assignors to Libbey-Owens-Ford Glass Company, Toledo, Ohio, a corporation of Ohio
Filed July 2, 1958, Ser. No. 746,120
7 Claims. (Cl. 117—54)

This invention relates to apparatus for filming articles as well as methods for producing these articles. More particularly, it is concerned with the production of heat rejecting plate glass or other transparent material by a vacuum evaporation method.

The use of a heat rejecting coating on glass windows is desirable in both buildings and automobiles not only because such films reject the heat but also because less heat is absorbed by the window itself, and this is desirable in the case of double glazed units wherein absorbed heat may be trapped both in the glass elements and the dehydrated air space therebetween. The reduction of the heat absorbed by these elements reduces the load on air conditioning equipment inasmuch as little trapped heat is present to be reradiated into the building.

However, it has not been practical in the past to produce a glazing unit which has been coated with a heat rejecting film of such a size as to be practical in both buildings and automotive vehicles. One of the primary difficulties encountered in the production of such coated glass sheets was the fact that the coating chamber had to be evacuated each time a window was to be coated and such an operation was not only time consuming but also prohibitively expensive because of the large number of the coating chambers required to contain sheets of glass of the size used in glazing units.

Therefore, an object of the present invention is to provide an improved method for the production of heat rejection windows.

Another object of the present invention is to provide an improved apparatus for coating transparent sheets by thermal evaporation which has a coating chamber which is constantly evacuated.

Another object of the invention is to provide an improved method of introducing objects into an improved vacuum chamber for coating by thermal evaporation and for removing the objects from the chamber subsequent to coating.

Other objects and advantages of the invention will become more apparent during the course of the following description when taken in connection with the accompanying drawings.

In the drawings, wherein like numerals are employed to designate like parts through the same:

Figure 1:
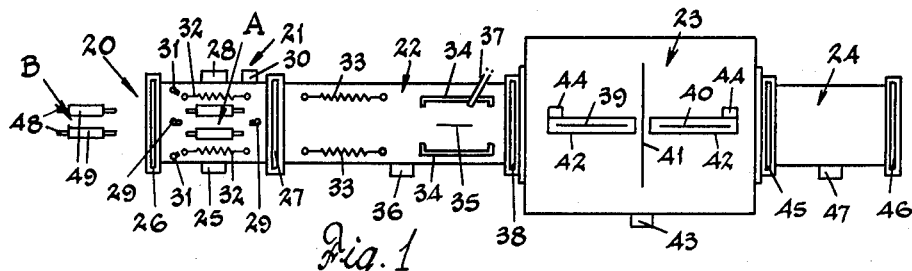
FIG. 1 is a schematic view of the filming unit with the various vacuum chambers used in carrying out the method of the present invention and shows a pair of glass sheets after they have entered the units.

With reference now to the drawings and particularly FIGS. 1 to 6, there is schematically shown an evacuated filming apparatus 20 comprising an intake chamber 21, a cleaning chamber 22, a coating chamber 23 and a discharge chamber 24 which are separated by vacuum valves that seal the chambers from one another or from the atmosphere when closed and establish a communication therebetween when open. While the intake chamber 21 is at atmospheric pressure an air dryer 25 continuously purges this section of the filming unit 20 with dry air.

The intake chamber 21 is sealed from the atmosphere by means of an inlet vacuum valve 26 and is further sealed from the cleaning chamber 22 by means of the vacuum valve 27. When valves 26 and 27 are closed, the pressure in chamber 21 is reduced from atmospheric to $10^{-3}$ mm. Hg by suitable vacuum pumps 28 and during the first portion of the pump-down air is blown downwardly across the surfaces to be filmed from suitable air guns 29 to remove dust and lint therefrom. A Precipitron 30 (reg. trademark) is installed in the intake chamber to collect the dust and lint which is removed by the blast from the air guns 29. To prevent a static charge from being built up on the surface which is being cleaned plutonium probes 31 are used in conjunction with the air guns 29 to neutralize the electrical charge on this surface thereby preventing foreign particles such as dust and lint from settling thereon.

In order to shorten the production cycle it is sometimes advantageous to commence the heating of the article to be filmed in the intake chamber 21 to provide sufficient time to heat the article to the required temperature. This heating is supplied by suitable heating elements 32 which may be Weigand (reg. trademark) space heaters or coils of high temperature non-sputtering resistance wire or the like located within chamber 21. Heating during the first portion of the pump-down not only provides additional heating time but also provides more efficient heating because the article is heated by convection as well as by radiation.

Heating elements 33 similar to heating elements 32 are positioned within that portion of the cleaning chamber 22 which lies adjacent the vacuum valve 27. An inner chamber 34, preferably of aluminum or titanium sheet metal, is positioned at the opposite end of the cleaning chamber 22 which is adjacent the coating chamber 23, and this inner chamber forms a box that fits closely to the article and confines the glow during the cleaning operation. A glow plate 35 which may be aluminum or other non-sputtering metal is positioned between the surfaces to be coated. Thus, the glow is largely confined to the area surrounding the glow plate 35 by the articles within the inner chamber 34.

The cleaning chamber 22 is considerably larger than the intake chamber 21 as seen in FIGS. 1 to 6 and suitable vacuum pumps 36 maintain chamber 22 at a relatively low pressure of approximately $10^{-4}$ mm. Hg during transfer times and at a higher chamber pressure which may be in the range of 1 to 10 microns Hg while oxygen is introduced therein through the pipe 37 for a relatively high voltage glow discharge cleaning cycle. In order to separate the cleaning chamber 22 from the coating chamber 23 and establish a communication therebetween a vacuum valve 38 is installed therebetween.

The relatively large coating chamber 23 lies adjacent to the cleaning chamber 22 at the opposite end from the intake chamber and this chamber is of sufficient size so that any object being filmed may be located at least 40 inches away from the evaporant sources 39 and 40. This unusually great distance decreases the number of evaporant sources required and a baffle 41 prevents the evaporants from one source from depositing on the surface of an article when it is in the position to receive evaporants from the other source.

Figure 5:
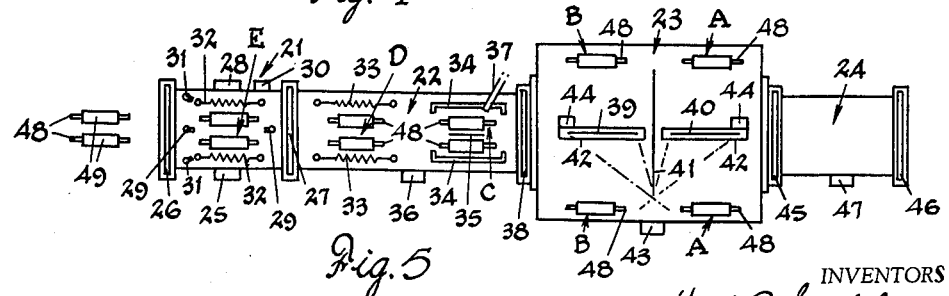
FIG. 5 is a schematic view similar to FIG. 1 showing the position of the glass sheets during the second coating portion of the cycle.

More particularly, as seen in FIG. 5, the baffle 41 is positioned between the sources 39 at right angles to the path of travel of the articles to be coated and extends transversely across the coating chamber 23 a distance great enough to prevent the source 39 from "seeing" the surface of the articles on carriers A. Likewise the source 40 cannot "see" the surface of the articles on carriers B, however, the baffle 41 does not extend laterally to a point where it would prevent the forward movement of the articles through the filming apparatus 20. It is to be understood that the size of the baffle 41 will depend upon the spacing and the size of the sources 39.

The coating chamber 23 is equipped with suitable locks 42 for introducing and removing the evaporant source 39 and 40 from the filming unit. Vacuum pumps 43 maintain the coating chamber at a pressure of less than $10^{-5}$ mm. Hg throughout the entire coating cycle while vacuum pumps 44 evacuate the locks 42 to permit the evaporant sources to be moved into the coating chamber 23.

The coating chamber 23 is separated from the discharge chamber 24 by means of a vacuum valve 45 which prevents the vacuum in the coating chamber 23 from being destroyed when the pressure within the discharge chamber 24 is raised to atmospheric pressure. The discharge chamber 24 is similar to the intake chamber 21 and is separated from the atmosphere by means of the vacuum valve 46. Suitable vacuum pumps 47 serve to evacuate this chamber.

According to the method of the present invention the transparent sheets 48 are placed upon a suitable carrier 49 such as a dolly or conveyor as shown schematically in FIGS. 1 to 6 and the intake vacuum valve 26 is opened to permit the sheets 48 and the carrier 49 as indicated by A to move into the intake chamber 21 at which time the intake vacuum valve 26 is then closed as shown in FIG. 1. The intake chamber 21 is then evacuated by pumps 28 and during the first portion of this evacuation it is necessary to bleed in clean dust-free gas to prepare the surfaces for coating by blowing off the sheets by means of the guns 29 to remove any residual lint or dust particles. The gas flow is controlled to maintain a high enough pressure in order that a Precipitron (reg. trademark) 30 may be used to collect the lint or dust. The air guns 29 and the Precipitron 30 are shut off simultaneously after a brief blow off period of preferably less than one minute. The sheets may also be heated by the heating elements 32 and the plutonium probes 31 prevent static charges from being built up on the surfaces of the sheets 48.

Figure 2:
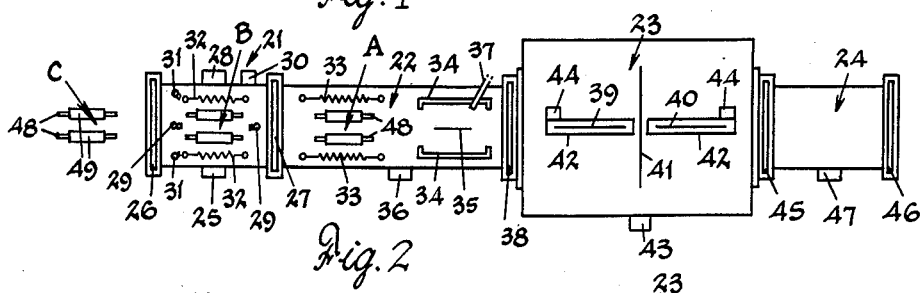
FIG. 2 is a schematic view similar to FIG. 1 but showing the position of the glass sheets while they are being heated during the cleaning portion of the cycle.

After the intake chamber 21 has been evacuated to approximately $10^{-3}$ mm. of Hg the valve 27 separating the intake chamber 21 from the cleaning chamber 22 is opened to permit the sheets 48 to be moved out of the intake chamber 21 and into the cleaning chamber 22 which has previously been evacuated to approximately $10^{-4}$ mm. of Hg. Upon entering this chamber the sheets 48 are positioned in close proximity to the heating elements 33 as shown in FIG. 2 for further heating and the separating vacuum valve 27 is closed at which time the intake chamber 21 is permitted to assume atmospheric conditions to receive a second carrier unit B. The air dryer 25 continuously purges this chamber with dry air while at atmospheric pressure to prevent the absorption of water vapor on the chamber surfaces thereby assisting the evacuating operation.

The cleaning chamber 22 is maintained at a vacuum of either $10^{-4}$ mm. Hg or 1 to 10 microns Hg and the sheets 48 are heated in either vacuum to the desired temperature which may be in the neighborhood of 500° F. by means of the heating elements 33. While the sheets on carrier A are being heated prior to glow cleaning, a second carrier B is moved into the intake chamber 21 as previously described in connection with carrier A.

Figure 3:
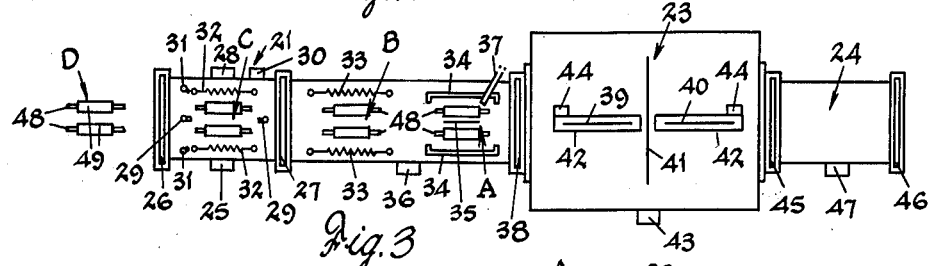
FIG. 3 is a schematic view similar to FIG. 1 but showing the position of the glass sheets while they are being cleaned by a glow discharge.

After the sheets on carrier A have been heated, they are moved to the glow portion of the cleaning chamber 22 which comprises the inner chamber 34 which fits closely around the sheets. Oxygen is bled into the chamber from the pipe 37 to maintain a desired vacuum having a pressure for example in the range of 1 to 10 microns Hg for a relatively high voltage glow discharge which may be in the neighborhood of 1500 volts using a non-sputtering material and the sheets 48 are thereby sufficiently cleaned without contaminating their surfaces. Before the sheets of the carrier A are cleaned by the glow discharge the carrier unit B is moved into the cleaning chamber through the vacuum valve 27 as shown in FIG. 3, and a third carrier C is moved into the intake chamber 21.

Figure 4:
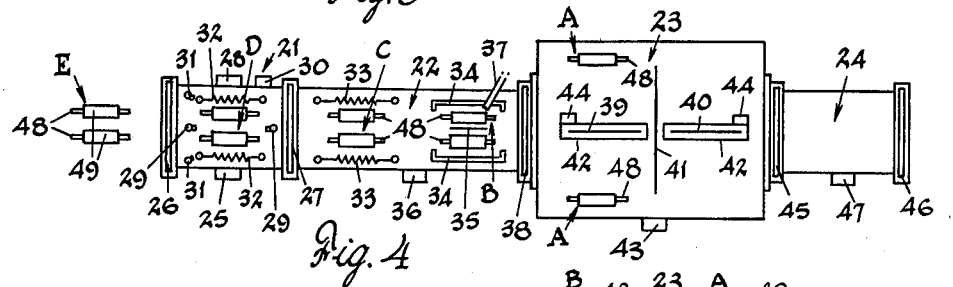
FIG. 4 is a schematic view similar to FIG. 1 and showing the position of the glass sheets during the first coating portion of the cycle.

After the sheets have been cleaned by the glow discharge the vacuum valve 38 on the entrance side of the coating chamber 23 is opened and the carrier A is moved into the coating chamber 23 as shown in FIG. 4. Also carrier B is moved into the inner chamber 34 and carrier C enters cleaning chamber 22 for heating while loaded carrier D is likewise moved into intake chamber 21. It is understood that the carriers 49 are automatically moved sequentially to the respective work stations as the vacuum valves are opened and the vacuums are not changed for any appreciable period of time.

According to the preferred embodiment of the present invention, the evaporant sources 39 and 40 are accurately positioned in the center of the coating chamber 23 and the sheets 48 are positioned along the walls thereof which permits the coating material to evaporate from both sides of the sources 39 and 40 thereby reducing waste. By accurately positioning the sources 39 and 40 equidistant between the sheets 46 the films deposited on the surfaces of these sheets are assured of being the same thickness.

In order to place the sheets 48 adjacent the walls of the coating chamber 23, the carriers 49 carrying the sheets 48 first enter the chamber 23 through the vacuum valve 38 and then are indexed or shifted outwardly to positions adjacent oppositely disposed walls of chamber 23 as shown in FIG. 4. After the vacuum valve 38 is closed, the sheets are coated by vacuum evaporation from source 39 for as long as necessary to produce the coating desired at the coating position. Following the first portion of the filming cycle the carrier 49 and sheets 48 are then moved to the second position in the coating chamber 23 for the second predetermined coating cycle if desired using source 40 as shown in FIG. 5 while carriers B, C, D and E also automatically advance.

Figure 6:
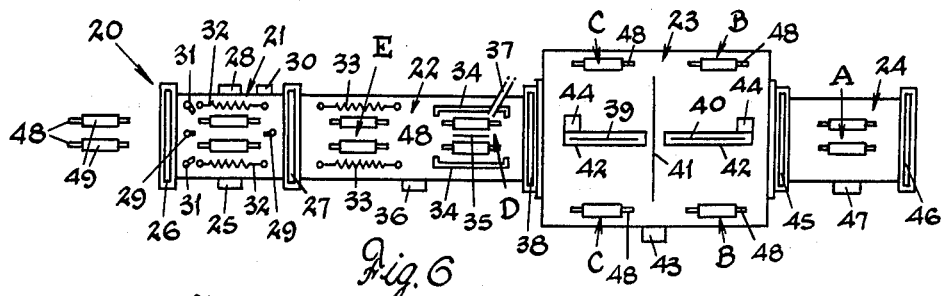
FIG. 6 is a schematic view similar to FIG. 1 but showing the position of the glass sheets prior to being discharged from the unit.

After the sheets 48 have been coated, the vacuum valve 45 is opened and the unit is moved into the discharge chamber 24 which has been evacuated to 10⁻³ mm. Hg by vacuum pumps 47 as shown in FIG. 6. Upon closing the vacuum valve 45 the discharge chamber 24 is raised to atmospheric pressure and the exit vacuum valve 46 is opened thereby permitting the carrier 49 and coated sheets 48 to be discharged from the coating chamber 24 while the other carriers are each sequentially advanced.

Figure 7:
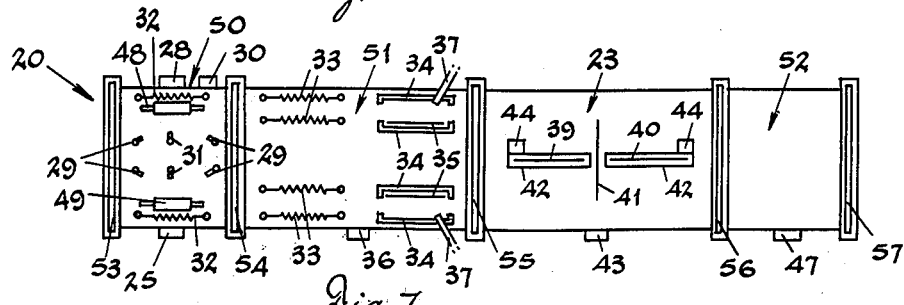
FIG. 7 is an alternate embodiment of the present invention in which space between the glass sheets is increased and the evaporant sources are positioned between the sheets.
Figure 8:
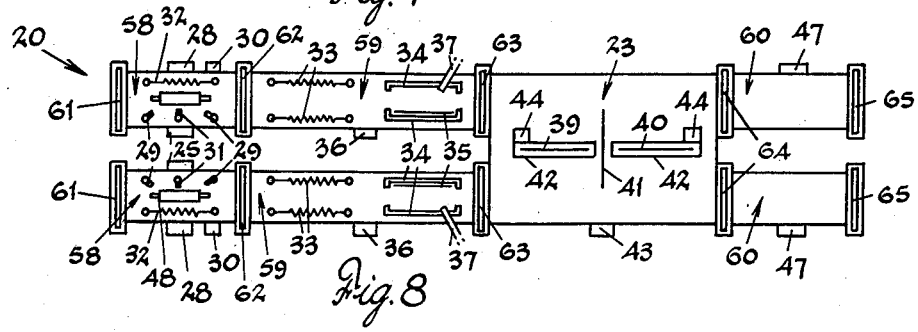
FIG. 8 is another embodiment of the present invention in which the glass sheets are passed through pairs of parallel vacuum chambers.
Figure 9:
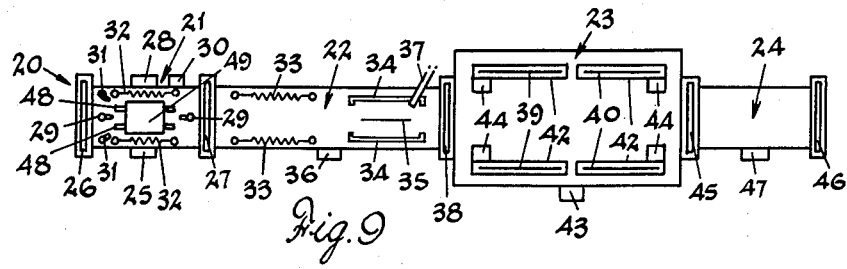
FIG. 9 is still another embodiment of the invention which utilizes filming sources along the outer walls of the coating chamber.

FIGS. 7, 8 and 9 show alternate embodiments of the apparatus utilized in carrying out the method of the present invention and like numerals are used to indicate like elements throughout the same. More particularly, there is shown in FIG. 7 a filming unit 20 in which the intake chamber 50, the cleaning chamber 51 and the discharge chamber 52 are substantially the same width as the coating chamber 23 and are separated by exceptionally large valves 53, 54, 55, 56 and 57. This increased width permits the carriers 49 carrying the sheets 48 to move along a path which is parallel and adjacent opposed walls of the unit 20 through the respective chambers and the step of indexing the carriers and sheets outwardly from the centerline of the unit 20 as these elements enter the coating chamber 23 through the valve 55 is eliminated.

FIG. 8 shows still another embodiment of the invention wherein a single large coating chamber 23 with evaporant sources 39 and 40 positioned substantially in the center thereof equidistant between the sheets 48 is utilized with parallel pairs of intake chambers 58, cleaning chambers 59 and discharge chambers 60 separated by relatively small valves 61, 62, 63, 64 and 65. Not only does this eliminate the outward indexing of the carriers 49 in the coating chamber 23 but also the volumes of chambers 58, 59 and 60 are decreased thereby permitting faster evacuation of these portions of the unit 20.

Still another embodiment of the invention is illustrated in FIG. 9 wherein the evaporant sources 39 and 40 and the locks 42 are placed adjacent the outermost walls of the coating chamber 23 and the carrier 49 supporting the sheets 48 is moved substantially along the center line of the filming unit 20. Not only does this eliminate the indexing of the carrier 39 in the coating chamber but also permits a single carrier 49 to support a plurality of sheets 48 while obtaining the advantage of the smaller intake chamber 21, cleaning chamber 22, and discharge chamber 24.

It is to be understood that the filming unit 20 is highly flexible and may be used for filming light transmissive and reflective mirrors; dichroic mirrors; transparent mirrors; interference filters; light and heat filters; low reflection, electrically conducting and graded coatings; as well as heat rejection glass. Also films can be deposited by the present method on opaque and semitransparent material, such as metal and plastics, as well as glass and other glassy siliceous material.

It is to be further understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:
1. A method of coating a hard glass sheet comprising the steps of subjecting the sheet to a first vacuum condition by reducing the pressure while directing a blast of air at a surface of said sheet, subjecting said sheet to a second vacuum condition which has a pressure that is less than said first vacuum condition, cleaning said sheet while being subjected to said second vacuum condition, subjecting said sheet to a third vacuum condition, depositing a film on a surface of said sheet while maintaining said sheet at said third vacuum condition, and subjecting said sheet to a fourth vacuum condition wherein the pressure is gradually increased to atmospheric pressure.

2. A method of coating a hard glass sheet as defined in claim 1, wherein the sheet is heated while being subjected to the first vacuum condition.

3. A method of coating a hard glass sheet as defined in claim 2, wherein the sheet is heated while being subjected to the second vacuum condition.

4. A method of coating a hard glass sheet comprising the steps of subjecting said sheet to atmospheric pressure, surrounding said sheet with a dehydrated fluid while at atmospheric pressure, reducing the ambient pressure surrounding said sheet to a first vacuum condition while directing a clean, dust-free fluid stream towards the surface of said sheet which is to be filmed, subjecting said sheet to a second vacuum condition, heating said sheet to an elevated temperature while under said second vacuum condition, cleaning said sheet while at said elevated temperature and under said second vacuum condition, subjecting said sheet to a third vacuum condition, depositing a film on said sheet by thermal evaporation, subjecting said sheet to a fourth vacuum condition, and raising the pressure of said fourth vacuum condition to atmospheric pressure.

5. A method of coating a hard glass sheet as defined in claim 4, wherein the electrical charge on the surface of the sheet to be coated is neutralized while the clean, dust-free fluid stream is directed thereon thereby preventing foreign particles from settling on said surface.

6. A method of coating hard glass sheets, comprising the steps of subjecting the sheet to atmospheric pressure, surrounding the sheet with dehydrated fluid while at atmospheric pressure, reducing the ambient pressure surrounding said sheet to a first pressure condition while simultaneously directing a blast of air to the surfaces of said sheets, heating said sheet while the latter is subjected to said first vacuum condition, neutralizing the electrical charge of the surface of the sheet while in said first vacuum condition, subjecting the sheet to a second vacuum condition which has a pressure less than said first vacuum condition, heating said sheet to an elevated temperature while under said second vacuum condition, cleaning said sheet while under said second vacuum condition and at said elevated temperatures, subjecting the sheet to a third vacuum condition, depositing a film on said sheet by thermal evaporation while at said third vacuum condition, subjecting said sheet to a fourth vacuum condition and raising the pressure of said fourth vacuum condition to atmospheric pressure.

7. In an apparatus for coating a succession of hard glass sheets, the combination of adjoining intake, cleaning, filming and discharge chambers disposed end-to-end and having connections therebetween to permit passage of the sheets between adjacent chambers, a valve mounted in each of said chambers for selectively establishing and preventing communication between adjacent chambers, evacuating means connected to each of said chambers to independently and selectively reduce the pressure in said chambers, an additional valve mounted at the outer end of each of said intake and discharge chambers for selectively establishing and preventing communication with the atmosphere, said intake chamber being connected to a source of dry air while at atmospheric pressure to continuously purge said chamber, means operatively associated with said intake chamber for blowing air across a surface of sheets positioned therein while said intake chamber is simultaneously being evacuated, said intake chamber also including means for neutralizing the electrical charge of the sheet surface, a cleaning means contained in said cleaning chamber including a high voltage, glow discharge plate, thermal evaporation filming means contained in said filming chamber for coating said sheets, means for raising the pressure of said discharge chamber to atmospheric pressure, and carrier means for transporting said sheets intermittently through said chambers.

References Cited in the file of this patent

UNITED STATES PATENTS

| | | |
|---|---|---|
| 2,224,236 | Shoemaker | Dec. 10, 1940 |
| 2,382,432 | McManus et al. | Aug. 14, 1945 |
| 2,384,500 | Stoll | Sept. 11, 1945 |
| 2,420,724 | Rice | May 20, 1947 |
| 2,562,182 | Godley | July 31, 1951 |
| 2,622,041 | Godley | Dec. 16, 1952 |
| 2,656,284 | Toulmin | Oct. 20, 1953 |
| 2,930,347 | Bulloff | Mar. 29, 1960 |
| 2,963,001 | Alexander | Dec. 6, 1960 |

FOREIGN PATENTS

| | | |
|---|---|---|
| 466,482 | Great Britain | May 28, 1937 |
| 117,359 | Russia | Jan. 28, 1958 |

OTHER REFERENCES

"Vacuum Deposition of Thin Films," by L. Holland (1956), John Wiley and Sons, Inc., N.Y.